US009447319B2

(12) United States Patent
Todorov et al.

(10) Patent No.: US 9,447,319 B2
(45) Date of Patent: Sep. 20, 2016

(54) YELLOW PHOSPHOR HAVING AN INCREASED ACTIVATOR CONCENTRATION AND A METHOD OF MAKING A YELLOW PHOSPHOR

(71) Applicant: Cree, Inc., Durham, NC (US)

(72) Inventors: Iliya S. Todorov, Durham, NC (US); Brian T. Collins, Holly Springs, NC (US)

(73) Assignee: Cree, Inc., Durham, NC (US)

( * ) Notice: Subject to any disclaimer, the term of this patent is extended or adjusted under 35 U.S.C. 154(b) by 567 days.

(21) Appl. No.: 13/714,992

(22) Filed: Dec. 14, 2012

(65) Prior Publication Data

US 2014/0167600 A1 Jun. 19, 2014

(51) Int. Cl.
H05B 33/14 (2006.01)
C09K 11/77 (2006.01)
H05B 33/12 (2006.01)

(52) U.S. Cl.
CPC ........... *C09K 11/7774* (2013.01); *H05B 33/12* (2013.01)

(58) Field of Classification Search
CPC . H01L 33/502; H01L 51/5012; H01L 33/50; H01L 33/504; H01L 33/505; H01L 33/58; H01L 33/14; H01L 2924/0002; H01L 2924/00; H01L 25/0753; H01L 2224/48091; H01L 33/0079; H01L 33/507; H01L 33/44; H01L 33/62; H01L 33/647; H01L 2924/00014; C09K 11/7774; H05B 33/12
USPC ........................................................ 313/503
See application file for complete search history.

(56) References Cited

U.S. PATENT DOCUMENTS

| 3,564,322 A | 2/1971 | Blasse et al. ................... 313/92 |
| 4,024,070 A | 5/1977 | Schuil ........................ 252/301.4 |
| 4,034,257 A | 7/1977 | Hoffman ........................ 313/487 |
| 4,479,866 A | 10/1984 | Sone et al. ..................... 204/425 |
| 5,076,964 A | 12/1991 | Kasenga et al. ........... 252/301.4 |
| 6,409,938 B1 | 6/2002 | Comanzo ................. 252/301.4 |
| 2010/0032623 A1 | 2/2010 | Lange ........................ 252/301.4 |
| 2010/0033075 A1* | 2/2010 | Naum ................ C09K 11/7774 313/486 |
| 2010/0301739 A1 | 12/2010 | Nakamura et al. |
| 2013/0009541 A1* | 1/2013 | Zheng ................ C09K 11/0883 313/503 |
| 2013/0069007 A1* | 3/2013 | Miyagawa ......... C09K 11/7721 252/301.6 R |

FOREIGN PATENT DOCUMENTS

| WO | WO 2011/102566 A1 | 8/2011 | ............. C09K 11/80 |
| WO | WO 2012/170266 A1 | 12/2012 | |

OTHER PUBLICATIONS

International Search Report Application and Written Opinion for International Application No. PCT/US2013/074287, mailing date Jan. 27, 2014.
Fadlalla, H. M. H. et al., "Synthesis and characterization of photoluminescent cerium-doped yttrium aluminum garnet," *Materials Research Bulletin*, 43, 12 (2008) pp. 3457-3462.
Pan, Yuexiao et al., "Tailored photoluminescence of YAG:Ce phosphor through various methods," *Journal of Physics and Chemistry of Solids*, 65, 5 (2004) pp. 845-850.

\* cited by examiner

*Primary Examiner* — Donald Raleigh
(74) *Attorney, Agent, or Firm* — Brinks Gilson & Lione

(57) ABSTRACT

A yellow phosphor having an increased activator concentration includes a host lattice comprising yttrium aluminum garnet (YAG) and an activator comprising cerium in the host lattice, where the cerium is present at a concentration of at least about 5 wt. % Ce. A method of making a yellow phosphor includes forming a reaction mixture comprising: a first precursor comprising cerium and oxygen; a second precursor comprising cerium and fluorine; a third precursor comprising yttrium; and a fourth precursor comprising aluminum. The reaction mixture is heated in a reducing environment at a temperature sufficient to form a yellow phosphor including a host lattice comprising yttrium aluminum garnet and an activator comprising cerium (Ce) incorporated in the host lattice.

28 Claims, 7 Drawing Sheets

YELLOW PHOSPHOR HAVING AN INCREASED ACTIVATOR CONCENTRATION AND A METHOD OF MAKING A YELLOW PHOSPHOR

TECHNICAL FIELD

The present disclosure is related generally to phosphors for light emitting devices and more particularly to a yellow phosphor comprising yttrium aluminum garnet (YAG).

BACKGROUND

Light emitting diodes (LEDs) are solid state devices that convert electric energy to light, and generally comprise one or more active layers of semiconductor material sandwiched between oppositely doped layers so as to define a p-n junction. When a bias is applied across the p-n junction, holes and electrons are injected into the active layer where they recombine to generate light in a process called injection electroluminescence. Light may be emitted from the active layer through all surfaces of the LED.

As most LEDs are nearly monochromatic light sources that appear to emit light having a single color, light emitting devices or lamps including multiple LEDs that can emit light of different colors have been employed to produce white light. In these devices, the different colors of light emitted by the individual LEDs combine to produce a desired intensity and/or color of white light. For example, by simultaneously energizing red, green and blue light emitting LEDs, the resulting combined light may appear white, or nearly white.

As an alternative to combining individual LEDs to produce light emitting devices having a particular light emission spectrum, luminescent materials, or phosphors, may be used to control the color of light emitted from LEDs. A phosphor may absorb a portion of the light emitted from an LED at a given wavelength and re-emit the light at different wavelength via the principle of photoluminescence. The conversion of light having a shorter wavelength (or higher frequency) to light having a longer wavelength (or lower frequency) may be referred to as down conversion. For example, a down-converting phosphor may be combined with a blue LED to convert some of the blue wavelengths to yellow wavelengths in order to generate white light.

A widely used phosphor for white light generation is yttrium aluminum garnet (YAG) doped with cerium (Ce), i.e., $Y_{3-x}Ce_xAl_5O_{12}$ or YAG:Ce. This yellow phosphor may be used in combination with a blue LED to produce white light. Compared to other phosphors based on silicates and sulfides, for example, YAG:Ce has a relatively high absorption efficiency of blue excitation radiation, a high quantum efficiency (greater than 90%), good stability in high temperature and/or high humidity environments, and a broad emission spectrum.

In some cases, a red phosphor is added to a light emitting device including a blue LED and a YAG:Ce phosphor in order to further shift the emitted light into the desired neutral white color bins (e.g., E3 to E6). Red phosphors are generally less efficient emitters than YAG:Ce, however, and thus the luminous efficiency of the light emitting device may be decreased when a red phosphor is used. It is therefore of interest to find other ways to shift the light emission of yellow phosphors to longer wavelengths.

Several current approaches to shifting the YAG:Ce emission to longer wavelengths involve chemical substitution (doping and/or co-doping) of yttrium, aluminum, and/or oxygen of the garnet lattice structure with other atoms. For example, gadolinium (Gd) or terbium (Tb) may be substituted for Y; chromium (Cr) may be substituted for Al; silicon (Si) and magnesium (Mg) may be substituted for Al; praseodymium (Pr) and Cr may be simultaneously substituted for Y and Al, respectively; and Si and nitrogen (N) may be simultaneously substituted for Al and O, respectively.

However, the resulting phosphor may exhibit a lower luminescence efficiency compared to mixtures of yellow and red phosphors, or the shift in wavelength may be accompanied by a decrease in the luminescence quenching temperature (i.e., the phosphor emission or conversion efficiency may decrease with increasing temperature). This means that the operation of the LED device may be impaired at elevated temperatures (e.g., 30-45° C. and above), thereby causing a substantial loss of emission intensity.

BRIEF SUMMARY

An improved yellow phosphor having an increased activator concentration includes a host lattice comprising yttrium aluminum garnet (YAG) and an activator comprising cerium in the host lattice, where the cerium is present at a concentration of at least about 5 wt. % Ce.

A method of making a yellow phosphor includes forming a reaction mixture comprising: a first precursor comprising cerium and oxygen; a second precursor comprising cerium and fluorine; a third precursor comprising yttrium; and a fourth precursor comprising aluminum. The reaction mixture is heated in a reducing environment at a temperature sufficient to form a yellow phosphor including a host lattice comprising yttrium aluminum garnet and an activator comprising cerium (Ce) incorporated in the host lattice.

A light emitting diode (LED) component comprises a blue LED comprising a dominant wavelength in a range of from about 425 nm to about 475 nm and a yellow phosphor in optical communication with the blue LED. The yellow phosphor includes a host lattice comprising yttrium aluminum garnet and an activator comprising cerium incorporated in the host lattice. A light emission spectrum of the LED component defines a color line passing through an E3 bin on a CIE 1931 chromaticity diagram at a position below a centerpoint of the E3 bin, where the centerpoint is defined as a point at which the 3A, 3B, 3C and 3D sub-bins meet.

A light emitting diode (LED) component comprises a blue LED comprising a dominant wavelength in a range from about 425 nm to about 475 nm and a yellow phosphor and a red phosphor in optical communication with the blue LED. The yellow phosphor includes a host lattice comprising yttrium aluminum garnet and an activator comprising cerium incorporated in the host lattice, and the red phosphor comprises a peak emission wavelength in a range of from about 610 nm to about 660 nm. A weight ratio of the yellow phosphor to the red phosphor is greater than 9.5.

DETAILED DESCRIPTION

Figure 1:
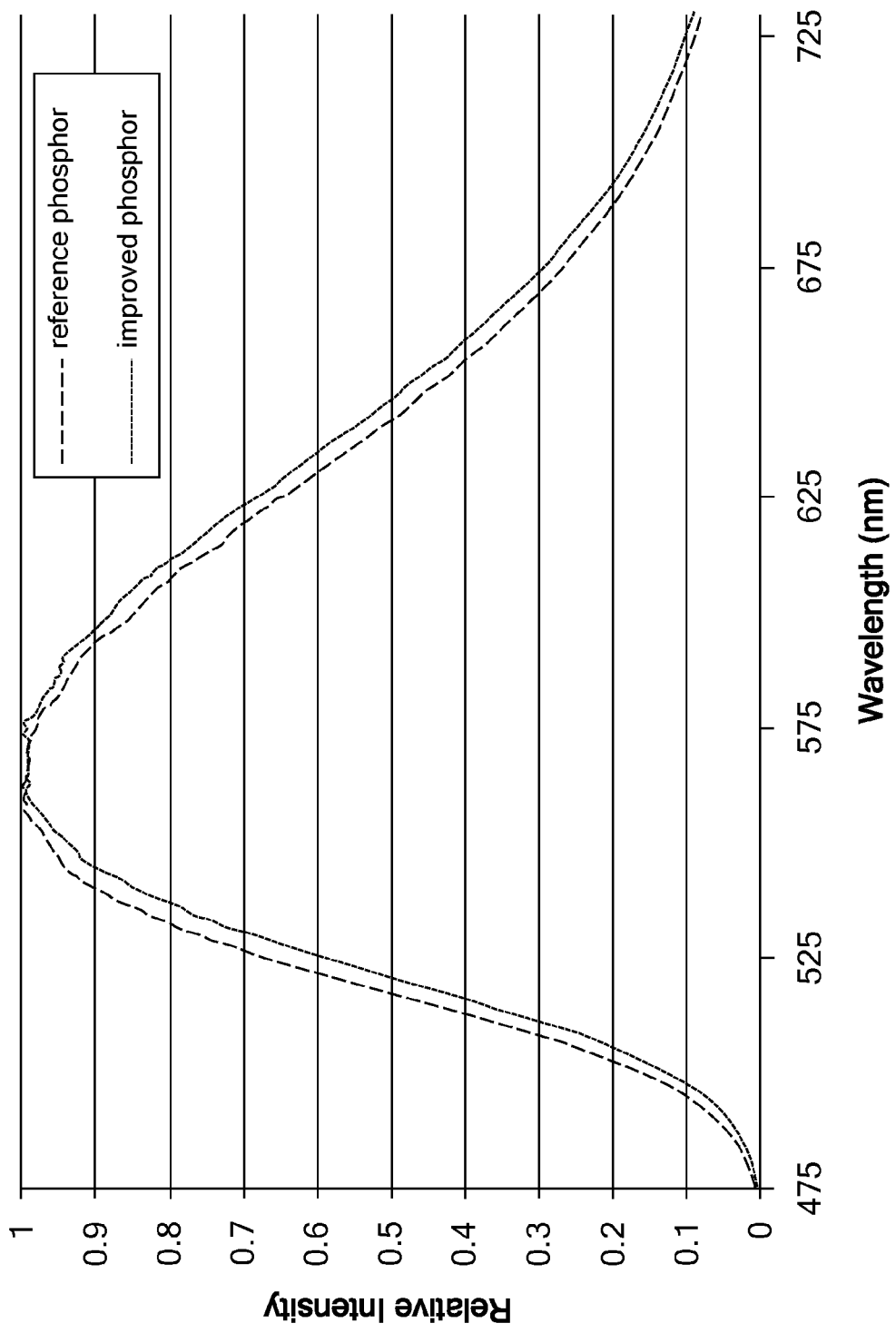
FIG. 1 shows normalized photoluminescence (PL) emission spectra obtained from a reference phosphor and an improved YAG:Ce yellow phosphor including about 5 wt. % Ce under 450 nm excitation.

Described herein is a method to incorporate an unprecedented amount of Ce into a YAG:Ce phosphor. By increasing the amount of Ce in the YAG host lattice, the emission of the yellow phosphor may be shifted to longer wavelengths without compromising the performance of the phosphor at elevated temperatures, such as the operating temperature of the light emitting device. This approach can solve the thermal quenching problem associated with chemical substitutions and may avoid the need for red phosphor additions. When the improved YAG:Ce phosphor is used in combination with a blue LED, a high brightness white light emitting device with a color point situated in the E3 to E6 neutral white color bins may be produced.

As used in the present disclosure, a "phosphor" or "phosphor composition" may refer to a material that absorbs light at one wavelength and re-emits the light at a different wavelength, where the re-emission includes visible light. The term phosphor may be used herein to refer to materials that are sometimes referred to as fluorescent and/or phosphorescent materials.

Also as used herein, "host lattice" refers to a crystal lattice of a given material that further includes a dopant, or "activator."

"Peak emission wavelength" refers to the wavelength of light at which the emission intensity of a phosphor or an LED is a maximum. LEDs typically have a light emission spectrum or intensity distribution that is tightly centered about the peak emission wavelength. The light emission spectrum of a phosphor or an LED may be further characterized in terms of the width of the intensity distribution measured at half the maximum light intensity (referred to as the full width at half maximum or "FWHM" width).

"Dominant wavelength" refers to the wavelength of light that has the same apparent color as the light emitted from the phosphor or LED as perceived by the human eye. Thus, the dominant wavelength differs from the peak wavelength in that the dominant wavelength takes into account the sensitivity of the human eye to different wavelengths of light.

A first device or phosphor that is described as being "in optical communication with" a second device or phosphor is positioned such that light emitted from the first device reaches the second device.

As used herein, "ccx" or "CCx" refers to correlated color X and "ccy" or "CCy" refers to correlated color y, where these coordinates (ccx, ccy) are calculated using the standard color matching functions that describe the 1931 CIE color space or chromaticity diagram.

The term "bins" or "color bins" refer to partitions of the 1931 CIE chromaticity diagram as defined by ANSI C78.377. The term "sub-bins" or "color sub-bins" refer to further subdivisions of the ANSI-defined bins as defined by Cree, Inc. for XLamp white LEDs. Bins and sub-bins are shown in FIG. 2B for a portion of the 1931 CIE color space.

A "reducing environment" is an environment controlled to include substantially no oxygen and/or oxidizing gases. The reducing environment may further contain actively reducing gases.

It is understood that when an element such as a layer, region, or substrate is referred to as being "on" another element, it can be directly on the other element or intervening elements may also be present. Furthermore, relative terms such as "inner," "outer," "upper," "above," "over," "overlying," "beneath," "below," "top," "bottom," and similar terms, may be used herein to describe a relationship between elements. It is understood that these terms are intended to encompass orientations of the device that differ from those depicted in the figures.

Although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

The figures are intended as schematic illustrations. As such, the actual dimensions and shapes of the devices and components (e.g., layer thicknesses) can be different, and departures from the illustrations as a result of, for example, of manufacturing techniques and/or tolerances may be expected. Embodiments should not be construed as limited to the particular shapes of the regions illustrated herein but are to include deviations in shapes that result from, for example, manufacturing. A region illustrated or described as square or rectangular may have rounded or curved features due to normal manufacturing tolerances. Thus, the regions illustrated in the figures are schematic in nature and their shapes are not intended to illustrate the precise shape of a region of a device and are not intended to limit the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The improved yellow phosphor includes a host lattice comprising yttrium aluminum garnet (YAG) and an activator comprising cerium (Ce) in the host lattice, where the Ce is present at a concentration of at least about 5 wt. %. What is believed to be the best commercially available YAG:Ce phosphor—that is, the phosphor with the longest wavelength Ce emission and no additional measurable host lattice chemical element substitutions—has a Ce concentration of about 4 wt. %. As will be discussed below, by incorporating an increased amount of Ce into the YAG lattice, a desirable shift to longer wavelength may be obtained in the light emission of the yellow phosphor.

The amount of Ce that can be incorporated into the YAG lattice can be measured by any of a number of chemical characterization techniques, including x-ray fluorescence (XRF), inductively coupled plasma, and/or x-ray absorption near edge structure. By carrying out XRF measurements on 24 samples of an exemplary improved yellow phosphor and 18 samples of the best commercially available YAG:Ce yellow phosphor ("reference phosphor"), average values for the composition of each are obtained and compared, as shown in Table 1 below.

TABLE 1

Chemical Composition of YAG: Ce samples

| | Y (wt. %) | Ce (wt. %) | Ce range (wt. %) | Al (wt. %) | Total* wt. % |
|---|---|---|---|---|---|
| Improved phosphor avg. of 24 samples | 67.7 | 5.2 | 5.0-6.0 | 22.9 | 95.8 |
| Reference phosphor avg. of 18 samples | 71.2 | 3.7 | 3.5-4.1 | 22.0 | 96.9 |

*The reported wt. % are based on the metal fractions of the samples.

As indicated above, the exemplary improved phosphor includes at least about 5 wt. % Ce, and on average includes about 5.2 wt. % Ce. The concentration of Ce in the yellow phosphor ranges from about 5.0 wt. % to about 6.0 wt. %. In terms of mole fraction, the concentration of Ce is from about 0.135 to about 0.16. Accordingly, the improved yellow phosphor may have a formula $Y_{3-x}Ce_xAl_5O_{12}$, where x represents the mole fraction of Ce and $0.135 \leq x \leq 0.16$. In general, the improved yellow phosphor may include at least about 5.2 wt. % Ce, at least about 5.6 wt. % Ce, or at least about 6 wt. % Ce. For example, the improved yellow phosphor may include from about 5 wt. % Ce to about 6 wt. % Ce, or from about 5.5 wt. % Ce to about 6 wt. % Ce. The mole fraction (x) of Ce may range from about 0.14 to about 0.16, or from about 0.135 to about 0.16. For comparison, the reference phosphor includes about 4 wt. % Ce or less, corresponding to a mole fraction of Ce of about 0.11 or less, with no other dopant elements. In other words, the reference phosphor includes no detectible dopant elements beyond the level of any impurity elements present in the raw material powders from which the reference phosphor was prepared.

FIG. 1 shows normalized photoluminescence (PL) emission spectra obtained from the reference phosphor and the improved YAG:Ce yellow phosphor under 450 nm excitation. The improved phosphor, which includes on average about 5.2 wt. % Ce, has longer wavelength emission than the reference phosphor. Specifically, the peak emission wavelength of the former is shifted by about 1 nm to about 15 nm (e.g., about 7 nm) compared to the peak emission of the latter. The improved yellow phosphor was prepared using both $CeO_2$ and $CeF_3$ precursors at a weight ratio of about 1.6:1 (62 wt. %:38 wt. %) in the reaction mixture, as discussed further below.

Based on the photoluminescence spectra, ccx and ccy coordinates of the 1931 CIE chromaticity diagram (shown in FIG. 2A), may be calculated for the improved and reference phosphors. It is noted that the photoluminescence measurements on the improved and reference phosphors are carried out using the same instrument and under the same conditions, as set forth in the Experimental Details section below. For the improved yellow phosphor including at least about 5 wt. % Ce, the coordinates are (0.474, 0.514). In contrast, the reference phosphor having about 4 wt. % Ce or less has a lower ccx value in the range of from about 0.456 to about 0.464, and a higher ccy value in the range of from about 0.520 to about 0.527. In general, the improved yellow phosphor may have a ccx value (or ccx coordinate) of at least about 0.47, and a ccy value (or ccy coordinate) of less than 0.52. For example, the ccx value of the improved yellow phosphor may be from about 0.471 to about 0.474, and the ccy value may be from about 0.513 to about 0.515.

The advantage of the improved yellow phosphor may be expressed in terms of the difference (or delta Δ) in the ccx (and/or ccy) values compared to those of the reference phosphor. As set forth above, the reference phosphor is a YAG phosphor including about 4 wt. % Ce with no other dopant elements. The improved YAG:Ce yellow phosphor may have a Δccx value compared to the reference phosphor of at least about 0.007 or at least about 0.010, and the Δccx value may be at most about 0.018. For example, the Δccx may range from about 0.01 to about 0.02. In addition, the improved yellow phosphor may have a Δccy value compared to the reference phosphor of at least about −0.005 or at least about −0.010, and the Δccy value may be at most about −0.014, or at most about −0.015. For example, the Δccy value may range from about −0.005 to about −0.015.

Figure 2A:
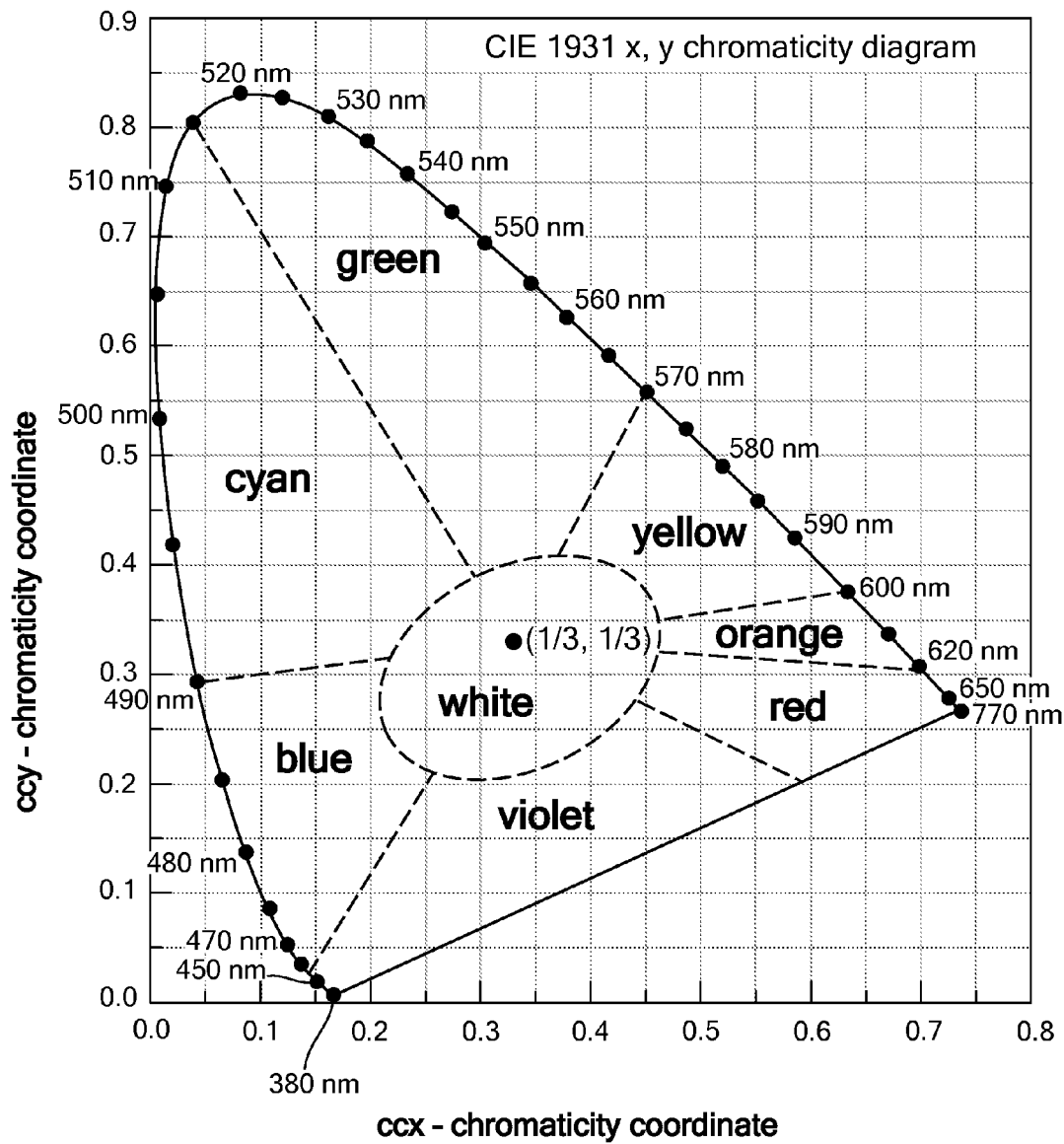
FIG. 2A provides a rendering of the 1931 CIE chromaticity diagram; pure or saturated colors are located around the perimeter of the paraboloid and white light is located near its center.
Figure 2B:
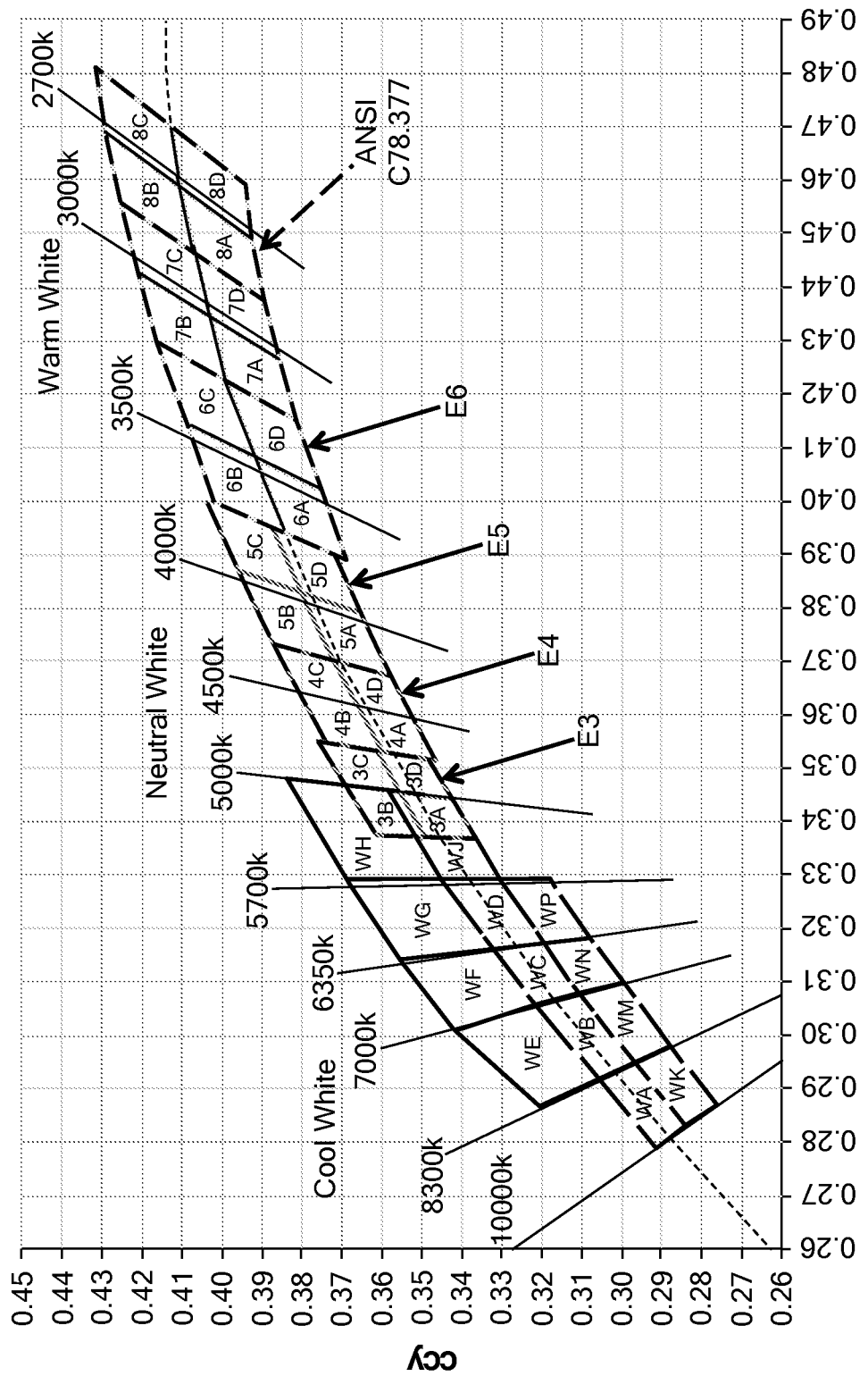
FIG. 2B shows subdivisions (sub-bins) of ANSI-defined bins defined by Cree for Xlamp white LEDs, where the sub-bins allow for progressively tighter specification and the potential for finer product uniformity.
Figure 3:
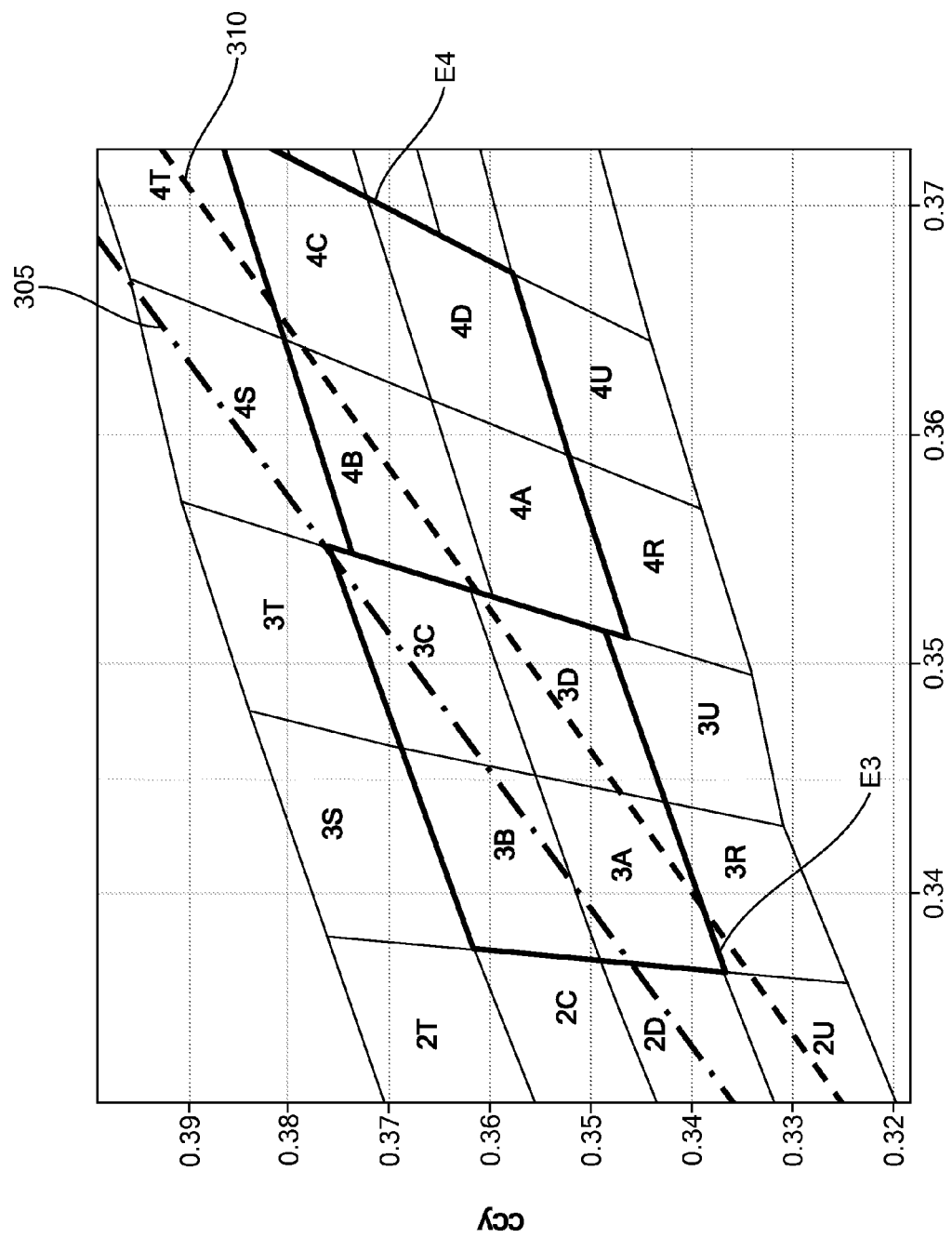
FIG. 3 shows color lines corresponding to a previous LED component including the reference phosphor and also to an improved LED component including a YAG:Ce phosphor having the light emission profile shown in FIG. 1.

Accordingly, color lines corresponding to (1) a reference LED component including the reference phosphor and a blue LED; and (2) an improved LED component including the improved yellow phosphor and a blue LED, are obtained and plotted in FIG. 3, which shows a portion of the 1931 CIE chromaticity diagram of FIGS. 2A and 2B. The blue LED has a dominant (Dom) wavelength of 456 nm and (ccx, ccy) of about (0.157, 0.018).

TABLE 2

Color point (ccx, ccy) and dccy values determined from photoluminescence data

| YAG: Ce versus Reference phosphor | Photoluminescence data | | |
|---|---|---|---|
| | (dccy) | ccx | ccy |
| Improved phosphor | −0.012 | 0.474 | 0.514 |
| Reference phosphor | 0.000 | 0.456-0.464 | 0.520-0.527 |

Referring to FIG. 3, and comparing the color line 305 for the reference phosphor with the color line 310 for the improved phosphor, a dccy of −0.012 may be obtained. The dccy in this example is the differential between a ccy coordinate from the reference phosphor color line 305 and the corresponding ccy coordinate (determined at the same ccx value) from the improved yellow phosphor color line 310. As can be seen in the figure, the color line 310 from the improved yellow phosphor is shifted relative to that 305 of the reference phosphor to a lower ccy value so as to pass through both the E3 and E4 color bins defined by ANSI C78.377, which is hereby incorporated by reference. The dccy may be at least about −0.002, at least about −0.004, or at least about −0.010. For example, the dccy may range from about −0.004 to about −0.015, or from about −0.008 to about −0.012.

Figure 6:
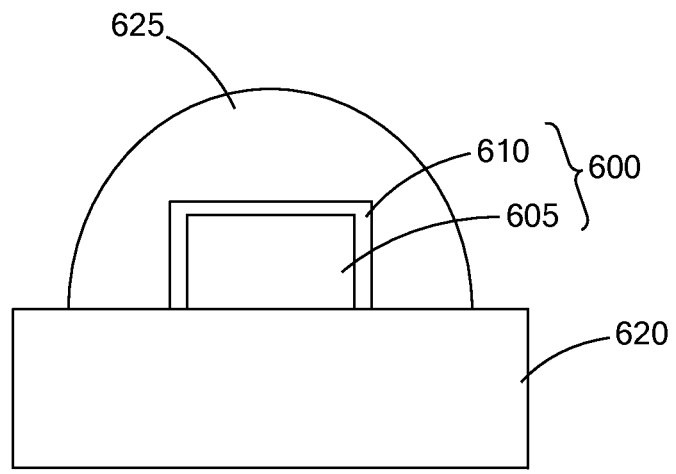
FIG. 6 shows a schematic of an exemplary LED component comprising a blue LED and a yellow phosphor in optical communication with the blue LED.

A LED component according to the present disclosure may thus include a blue LED comprising a dominant wavelength in a range from about 425 nm to about 475 nm and a yellow phosphor in optical communication with the blue LED, where the yellow phosphor comprises a host lattice comprising yttrium aluminum garnet and an activator comprising cerium incorporated in the host lattice. A schematic of an exemplary LED component 600 including the yellow phosphor is shown in FIG. 6, where the yellow phosphor 610 is coated on a surface of a blue LED 605. The blue LED 605 may be disposed on a submount 620 and an optic or encapsulant 625 may overlie the blue LED 605, although other submount or package configurations are possible.

A light emission spectrum of the LED component defines a color line passing through an E3 color bin on a CIE 1931 chromaticity diagram. Referring to FIG. 3, the color line 310 advantageously passes through the E3 color bin at a position below a centerpoint thereof, where the centerpoint is defined as the point at which the sub-bins 3A, 3B, 3C and 3D meet. The color line 310 may also pass through an E4 color bin. In terms of the sub-bins shown in FIG. 3, the color line 310 of the LED component passes through the 3D sub-bin, and it may also pass through one or both of the 4B sub-bin and the 4C sub-bin. The yellow phosphor employed in the LED component may have any of the characteristics set forth above. For example, the cerium incorporated in the host lattice may be present at a concentration of at least about 5 wt. %.

Figure 7:
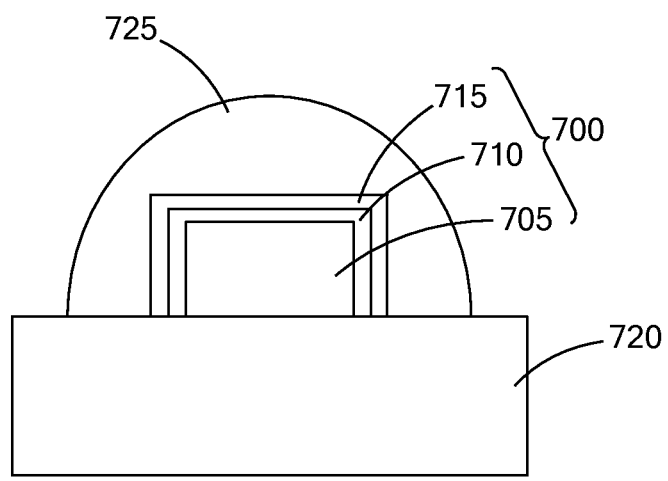
FIG. 7 shows a schematic of an exemplary LED comprising a blue LED and a yellow and red phosphors in optical communication with the blue LED.

According to another embodiment, the LED component may comprise a blue LED comprising a dominant wavelength in a range from about 425 nm to about 475 nm, and a yellow phosphor and a red phosphor in optical communication with the blue LED. The yellow phosphor comprises a host lattice comprising yttrium aluminum garnet and an activator comprising cerium incorporated in the host lattice, and the red phosphor comprises a peak emission wavelength in a range of from about 610 nm to about 660 nm. The yellow to red weight ratio for the LED component according to this embodiment is generally between 6.6 and 9.9, and in some embodiments is greater than 9.5. For example, the yellow to red weight ratio obtained with the improved yellow phosphor may be greater than 9.5 to about 9.9. Due to the high cerium content of the improved yellow phosphor, less red phosphor may be employed in the LED component than with current commercial yellow phosphors to achieve the desired light emission. A schematic of the LED component 700 of this embodiment is shown in FIG. 7, where the improved yellow phosphor 710 and a red phosphor 720 are coated on a surface of a blue LED 705. As in the previous embodiment, the blue LED 705 may be disposed on a submount 720 and an optic or encapsulant 725 may overlie the blue LED 705, although other submount or package configurations are possible.

Referring to FIG. 2B, a light emission spectrum of the LED component including the yellow and red phosphors may define a color line passing through an E5 color bin on a CIE 1931 chromaticity diagram. The color line may also pass through an E6 color bin. The yellow phosphor employed in the LED component of this embodiment may have any of the characteristics set forth previously. For example, the cerium incorporated in the host lattice may be present at a concentration of at least about 5 wt. %. Suitable red phosphors may include nitride phosphors such as (Ca, Sr)AlSiN$_3$:Eu, as described for example in U.S. patent application Ser. No. 12/271,945, entitled "Phosphor Composition," which is hereby incorporated by reference.

The LED 605, 705 shown schematically in FIGS. 6 and 7 may be a Group III nitride-based LED formed from nitrogen and Group III elements such as aluminum, gallium and/or indium in the form of nitride layers epitaxially grown and doped as would be understood by one of ordinary skill in the art to produce an LED emitting in the green to UV spectrum, for example blue light. In the embodiments of FIGS. 6 and 7, the phosphor is shown as coated on the LEDs, for example in a silicone or other matrix material. In other embodiments, the phosphor can be placed in and/or on an encapsulant and/or optic of the LED, such as silicone, epoxy or glass. Additional phosphors, such as red nitride phosphors or green LuAG phosphors can be mixed together in the matrix and/or positioned separately (in a remote phosphor configuration) on the optic and/or in discrete layers on the LED chip. In some embodiments, different colored LEDs can be utilized, e.g. LEDs including blue chips and phosphor with red LEDs, or LEDs packaged without phosphor or just LED chips on board with the phosphor(s) in a remote phosphor configuration as would be understood by one of skill in the art.

The LED components described above may be fabricated using methods known in the art as described for example in U.S. patent application Ser. No. 13/100,786 entitled "Light Emitting Diode (LED) for Achieving an Asymmetric Light Output," which is hereby incorporated by reference. In addition, the blue LEDs may be coated with the aforementioned yellow and/or red phosphors using any suitable method, such as that described U.S. patent application Ser. No. 11/656,759 and Ser. No. 11/899,790, both of which are entitled "Wafer Level Phosphor Coating Method and Devices Fabricated Utilizing Method" and both of which are hereby incorporated by reference.

A method of making an improved yellow phosphor that may exhibit the shift to longer wavelength emission described above involves combining two different cerium-containing precursors in a mixture that also includes a yttrium-containing precursor and an aluminum-containing precursor. The mixture of precursors undergoes a reaction in a reducing environment to yield the yellow phosphor. The reaction may include solid-state (solid-phase) and/or liquid-phase diffusion, as discussed further below.

Of the two different cerium-containing precursors, one of them (the "first precursor") comprises cerium and oxygen, and the other (the "second precursor") comprises cerium and fluorine. More specifically, the first precursor may comprise $CeO_2$, and the second precursor may comprise $CeF_3$. Other suitable precursors as the cerium and oxygen source include cerium nitrate, cerium carbonate, cerium sulfate and the like.

The inventors have discovered that, when $CeF_3$ is used in combination with $CeO_2$ in the reaction mixture, a yellow phosphor with a surprisingly good yellow color is achieved. The inventors believe the longer wavelength emission can be attributed to the increase in the Ce content of the YAG host lattice, as discussed above, which in turn is enabled by the combination of $CeF_3$ with $CeO_2$ during the reaction.

Figure 4:
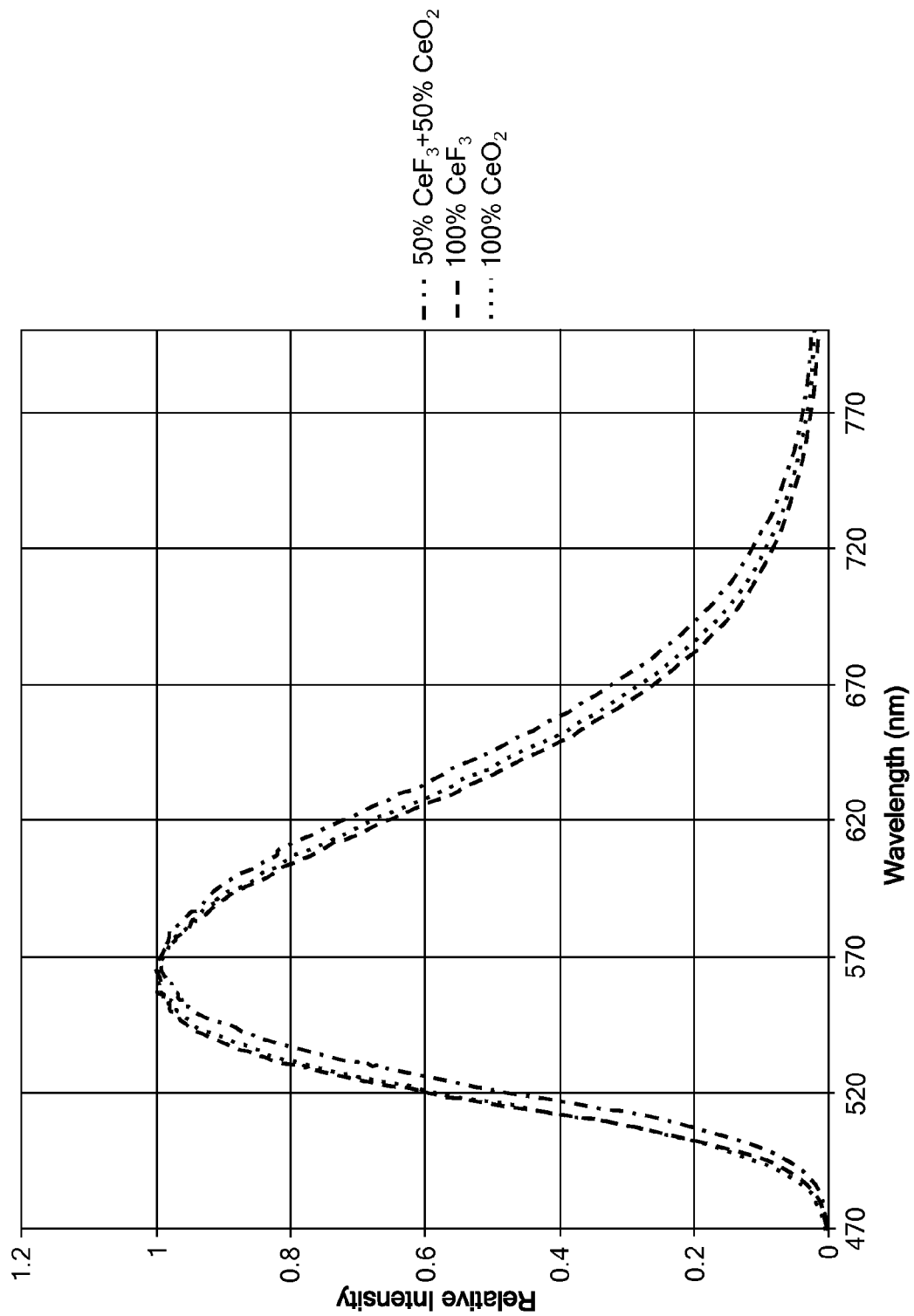
FIG. 4 shows normalized PL emission spectra from three exemplary YAG:Ce phosphors synthesized using (a) only $CeO_2$ as the cerium-containing precursor in the reaction mixture; (b) only $CeF_3$ as the cerium-containing precursor in the reaction mixture; and (c) both $CeO_2$ and $CeF_3$ as the cerium-containing precursors in a 1:1 weight ratio in the reaction mixture.

FIG. 4 shows normalized PL emission spectra from three exemplary YAG:Ce phosphors synthesized using (a) only CeO$_2$ as the cerium-containing precursor in the reaction mixture; (b) only CeF$_3$ as the cerium-containing precursor in the reaction mixture; and (c) both CeO$_2$ and CeF$_3$ as the cerium-containing precursors in a 1:1 weight ratio in the reaction mixture. The spectrum corresponding to (c) is shifted to longer wavelength compared to the other spectra; the peak emission wavelength is approximately 570 nm, instead of about 563 nm for (a) and about 560 nm for (b).

Figure 5:
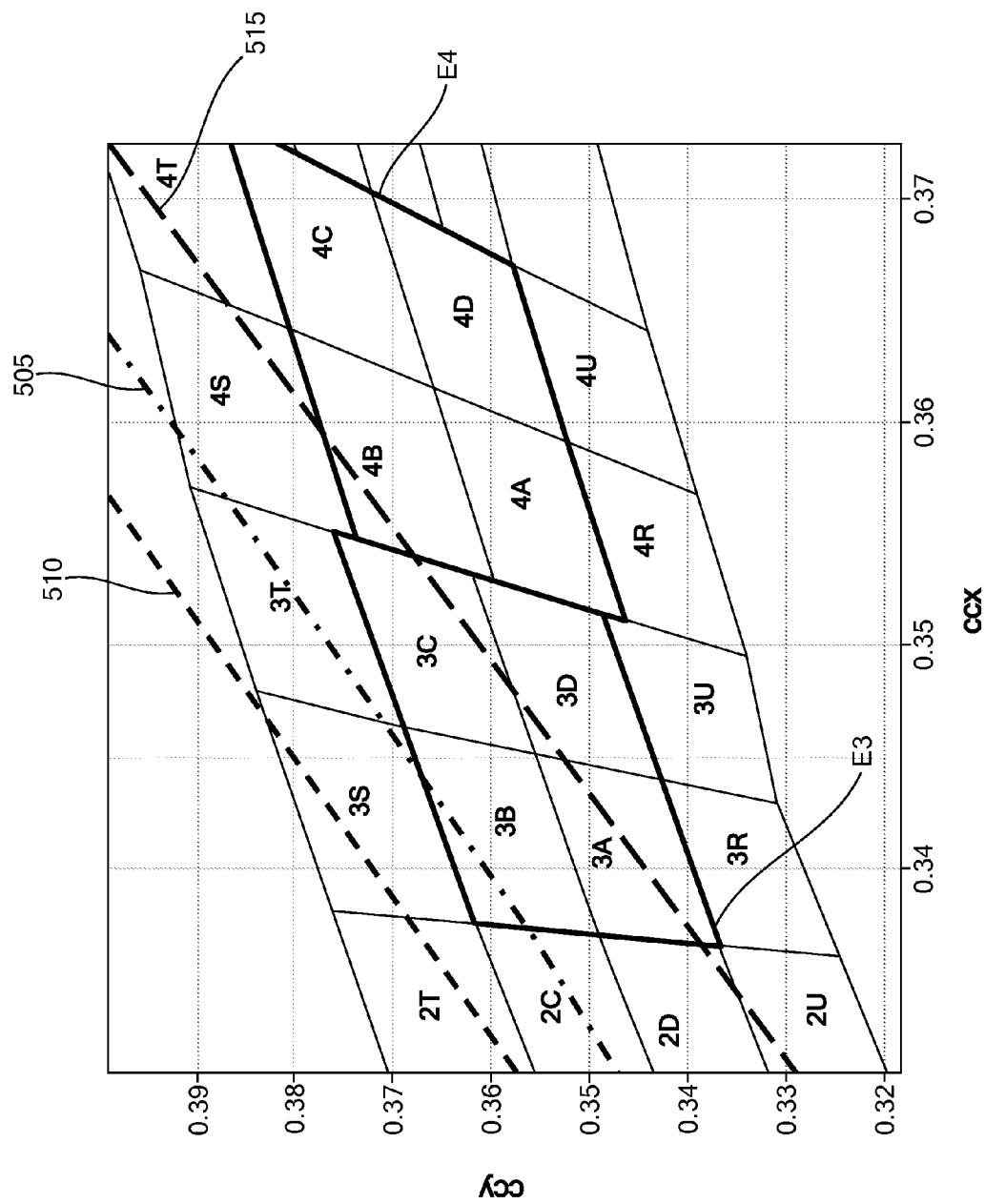
FIG. 5 shows color lines determined for exemplary LED components including blue LEDs and YAG:Ce phosphors synthesized using (a) only $CeO_2$ as the cerium-containing precursor in the reaction mixture; (b) only $CeF_3$ as the cerium-containing precursor in the reaction mixture; and (c) both $CeO_2$ and $CeF_3$ in a 1:1 weight ratio in the reaction mixture.

Referring to FIG. 5, color lines are determined for exemplary LED components including blue LEDs and YAG:Ce phosphors synthesized using (a) only CeO$_2$ as the cerium-containing precursor in the reaction mixture; (b) only CeF$_3$ as the cerium-containing precursor in the reaction mixture;

optionally hydrogen gas (H$_2$) may be present in the forming gas. For example, the forming gas may be a mixture of nitrogen gas and hydrogen gas including up to about 10% H$_2$, or up to about 5% H$_2$. Typically, a mixture of about 95% N$_2$ and about 5% H$_2$ is suitable to obtain a yellow phosphor powder including 5-6 wt. % Ce. In some examples, the forming gas may be entirely hydrogen (e.g., up to 100% H$_2$). The reaction may be carried out in a chamber comprising an outer vessel and lid and containing a crucible for holding the precursors. The crucible may be made of one or more refractory materials, such as a ceramic or a refractory metal. For example, the crucible may comprise Al$_2$O$_3$. During the reaction, the forming gas may be flowed continuously through the chamber.

TABLE 3

Exemplary Reaction Conditions

|  | Suitable Range A | Suitable Range B | Example |
| --- | --- | --- | --- |
| Flux (e.g., BaF$_2$) | 0-10 wt. % | 0-5 wt. % | 1.5 wt. % |
| Heating rate | 50-500 deg/hr | 300-400 deg/hr | 350 deg/hr |
| Firing temperature | 1375-1600° C. | 1410-1550° C. | 1475° C. |
| Dwell time | 0-5 hours | 0.1-3 hours | 1.5 hours |
| Firing atmosphere | Reducing | Forming gas | 95% N$_2$, 5% H$_2$ |
| Crucible | Ceramic/refractory metal | Al$_2$O$_3$ | Al$_2$O$_3$ |
| Precursor average particle size (d50) | 1-25 microns | 4-14 microns | 5-10 microns |
| Peak emission | 525-580 | 550-580 | 572-574 | and (c) both CeO$_2$ and CeF$_3$ in a 1:1 weight ratio in the reaction mixture. The color line 505 for (a), where only CeO$_2$ is used as the cerium-containing precursor in the reaction mixture, does not pass through the E4 color bin. When CeF$_3$ is used instead of CeO$_2$ as the cerium-containing precursor, the color line 510 shifts up in a direction away from the desired color bins. Surprisingly, however, the combination of CeO$_2$ and CeF$_3$ in the reaction mixture (in a 1:1 weight ratio in this example), leads to a shift of the color line 515 toward the desired color bins. Referring to FIG. 5, the color line 515 passes through the 4B and 4T sub-bins. This means that the light emitted from an LED component including the improved yellow phosphor and a blue LED may have a color point in the desired E4 neutral white color bin.

Additionally, as described above, it may be possible to build an LED component that can attain a color point in the E5 or E6 color bins by adding an unusually small amount of red phosphor to the component, such that the weight ratio of the yellow phosphor to the red phosphor is increased by about 5%. The resulting LED component including both the yellow phosphor described above and a small amount of red phosphor may exhibit a higher luminous flux and better reliability stability than previous LED components.

As noted above, a 1:1 weight ratio (50 wt. %:50 wt. %) of the CeO$_2$ and CeF$_3$ precursors may be employed in the reaction mixture. Other weight ratios of CeO$_2$ to CeF$_3$, particularly weight ratios greater than 1, may also be suitable. For example, the weight ratio may be at least about 1.2 (55 wt. %:45 wt. %), at least about 1.4 (58 wt. %:42 wt. %), at least about 1.6 (62 wt. %:38 wt. %), at least about 1.8 (64 wt. %:36 wt. %), at least about 2 (67 wt. %:33 wt. %), or at least about 2.2 (69 wt. %:31 wt. %). According to one embodiment, the weight ratio of CeO$_2$ to CeF$_3$ in the reaction mixture is about 1.6 (62 wt. %:38 wt. %).

The reducing environment in which the reaction mixture is heated may include a forming gas. Nitrogen gas (N$_2$) and The reaction typically occurs at a temperature of at least about 1400° C. For example, the precursors may be heated to a temperature in the range of from about 1375° C. to about 1600° C., or in the range of from about 1410° C. to about 1550° C. The temperature may also be about 1475° C. A heating rate of from about 50° C./h to about 500° C./h, 300° C./h to about 400° C./h, or about 350° C./h may be used to heat the precursors to the reaction temperature. The dwell time at the reaction temperature is generally about 5 h or less, and typically at least about 0.1 h. For example, the dwell time may be from about 0.1 h to about 5 h, from about 0.1 h to about 3 h, or about 1.5 h.

Fluorine containing compounds, such as BaF$_2$, LiF, NaF, AlF$_3$, YF$_2$ or NH$_4$, may be employed as fluxes during the reaction to reduce the reaction temperature and facilitate formation of the YAG:Ce phosphor. Generally, the flux may be present in the reaction mixture at a concentration of up to about 10 wt. %. For example, the concentration of the flux may be from about 1 wt. % to about 5 wt. %, from about 1 wt. % to about 2 wt. %, or about 1.5 wt. %.

The yttrium-containing precursor in the reaction mixture is typically Y$_2$O$_3$ powder, which may be obtained from Alpha Aesar Inc. of Ward Hill, Mass. The aluminum-containing precursor is typically Al$_2$O$_3$ (alumina) powder, in particular γ-Al$_2$O$_3$ (or γ-phase Al$_2$O$_3$) powder, which may be obtained from Alfa Aesar Inc. of Ward Hill, Mass. The precursor powders may have a median (d50) particle size in the range of from about 1 micron to about 25 microns, from about 4 microns to about 14 microns, or from about 5 microns to about 10 microns.

The inventors have recognized that the characteristics of the Al$_2$O$_3$ precursor may have an influence on the quality of the resulting yellow phosphor. As indicated above, the alumina precursor is preferably γ-phase Al$_2$O$_3$ powder. The alumina precursor may be mechanically milled or otherwise processed (e.g., by jet milling) in order to reduce the average particle size of the powder before adding the powder to the reaction mixture. The powders may be milled using a commercially available jet milling apparatus, which utilizes high pressure air to break up larger particles into smaller particles. Using such an apparatus, the alumina precursor powder may be reduced in particle size from a lateral size (e.g., width or diameter) of about 110 microns to about 2 microns or less.

Referring to Table 4, it may be seen that a reaction mixture including jet milled γ-$Al_2O_3$ powder (about 1.6 micron in median particle size) yields a yellow phosphor that exhibits a ccx value of from about 0.467 to about 0.472 and a ccy value of from about 0.514 to about 0.517. When tested as part of an LED component, a color line is obtained on the 1931 CIE color space that is shifted by −0.006 to about −0.010 compared to the color line obtained from an LED component including the reference (commercially available) phosphor. This downshift is larger in magnitude than that obtained from a yellow phosphor made using any of the other alumina precursors listed in Table 1.

Generally, the median (d50) particle size of the alumina precursor powder employed in the reaction mixture is about 5 microns or lower, or about 3 microns or lower, or about 1 micron or lower. For example, the $Al_2O_3$ precursor powder (which may be γ-$Al_2O_3$ powder that has been mechanically milled) may have a median particle size in the range of from about 1 micron to about 3 microns.

TABLE 4

Influence of Alumina Precursor on Light Emission of Yellow Phosphor

| Type of Alumina | d50* (microns) | YAG: Ce versus Ref. phosphor (dccy) | YAG: Ce (ccx) | YAG: Ce (ccy) |
|---|---|---|---|---|
| α-$Al_2O_3$ | 27.0 | 0.000 to −0.004 | 0.456-0.464 | 0.527-0.520 |
| γ-$Al_2O_3$ | 6.0 | 0.003 to −0.003 | 0.464-0.469 | 0.520-0.518 |
| γ-$Al_2O_3$ | 110 | 0.003 to −0.003 | 0.463-0.467 | 0.521-0.517 |
| γ-$Al_2O_3$ (jet milled) | 1.6 | −0.006 to −0.012 | 0.456-0.464 | 0.527-0.520 |
|  |  |  | 0.471-0.474 | 0.515-0.513 |

*Median particle size

Theoretical Analysis

To understand why the use of $CeO_2$ and $CeF_3$ in the reaction mixture may increase the yellow shift of the light emission from the resulting YAG:Ce phosphor, the chemistry of the reaction may be considered. Without wishing to be bound by theory, the inventors believe that in conventional solid-state methods of phosphor synthesis, where only $CeO_2$ is employed as a precursor, the reaction proceeds as follows, where Ce(IV) is first reduced to Ce(III):

$$2Ce^{IV}O_2(s) + H_2(g) \rightarrow Ce_2^{III}O_3(s) + H_2O(g) \tag{1}$$

As the reduction occurs, Ce(III) is available to participate in a reaction to form the YAG:Ce yellow phosphor:

$$3-x(Y_2O_3)(s) + x(Ce_2O_3)(s) + 5Al_2O_3(s) \rightarrow 2Y_{3-x}Ce_xAl_5O_{12}(s) \tag{2}$$

The inventors surmise that the YAG formation rate is higher than the Ce(IV) to Ce(III) reduction rate (that is, the reaction described by Equation (2) proceeds faster than the reaction described by Equation (1)), and thus the amount of Ce(III) that can be incorporated into the YAG host lattice is limited. If this supposition is correct, then it may be impossible to increase the amount of Ce(III) incorporated into the YAG lattice by simply increasing the starting $CeO_2$ concentration or by increasing the concentration of the reducing gas ($H_2$), or both.

The same analysis may be applied to the reaction chemistry of the alternative method set forth herein, where two different Ce-containing precursors are used. The inventors postulate that in a reducing atmosphere, $CeF_3$ can dissolve $CeO_2$ in the reaction mixture through the formation of CeOF according to Equation (3), set forth below:

$$2Ce^{IV}O_2(s) + H_2(g) + Ce^{III}F_3 \rightarrow 3Ce^{III}OF(L)^* + H_2O(g), \tag{3}$$

*3CeOF (l)=[$Ce_2O_3$.$CeF_3$] (l)

It is noted that CeOF exhibits the lowest melting point of 1375° C. compared to $CeF_3$ (melting point of 1430° C.), $Ce_2O_3$ (melting point of 2177° C.), and $CeO_2$ (melting point of about 2400° C.).

$$3-x(Y_2O_3)(s) + x(Ce_2O_3)(L) + 5Al_2O_3(s) \rightarrow 2Y_{3-x}Ce_xAl_5O_{12}(s) \tag{4}$$

Accordingly, the formation of YAG:Ce when both $Ce_2O_3$ and $CeF_3$ are used as precursors is believed to proceed in part through a liquid phase diffusion mechanism (see Equation (4)), which may occur at a faster rate than the solid phase diffusion that governs conventional methods of producing YAG:Ce. Consequently, the Ce(III) incorporation rate into the YAG host lattice may increase substantially. The inventors believe that the increased Ce concentration in the YAG lattice causes the long wavelength shift observed in the light emission spectrum of the YAG:Ce phosphor, as described above.

Experimental Details

To obtain the light emission spectra shown in FIGS. 1 and 4, a Hitachi F-7000 Fluorescence Spectrophotometer (USHIO xenon short lamp (UXL-152H); a quartz cell type S20-SQ-3) calibrated according to manufacturer specifications is employed. The sample is packed into the quartz cell. The excitation wavelength used is 450 nm with a full width at half maximum (FWHM) of about 15 nm. The emission spectra are analyzed from 470 nm to 800 nm, and (ccx, ccy) coordinates are calculated using the standard color matching functions that describe the 1931 CIE color space, as shown in FIG. 2.

The XRF measurements described here are conducted using a Bruker S2 Ranger XRF system calibrated according to manufacturer specifications. Nine calibration standards were used to define the calibration line for Y, Ce, and Al. The standards are prepared by mixing $Y_2O_3$, $CeO_2$, and $Al_2O_3$ with purity >99.99% such that the wt. % ranges were 17 to 70, 0 to 10 and 19 to 60 for Y, Ce and Al, respectively. Sample powders are spread to form a substantially uniform layer on top of a thin ultralene foil (4 μm thickness) secured between two plastic cylinders fit tightly together without a base. The foil preferably forms a uniform surface and is free of bubbles and/or creases. More than 5 grams of powders are used to obtain a correct measurement.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A yellow phosphor having an increased activator concentration, the yellow phosphor comprising:
   a host lattice comprising yttrium aluminum garnet (YAG); and
   an activator comprising cerium (Ce) in the host lattice, the cerium being present at a concentration of at least about 5 wt. % Ce,
   wherein the yellow phosphor has a chemical formula $Y_{3-x}Ce_xAl_5O_{12}$.

2. The yellow phosphor of claim 1, wherein the concentration is at least about 5.2 wt. % Ce.

3. The yellow phosphor of claim 1, wherein the concentration is from about 5 wt. % Ce to about 6 wt. % Ce.

4. The yellow phosphor of claim 1 where $0.14 \leq x \leq 0.16$.

5. The yellow phosphor of claim 1 comprising a ccx value of at least about 0.47.

6. The yellow phosphor of claim 5, wherein the ccx value is from about 0.471 to about 0.474.

7. The yellow phosphor of claim 5 comprising a Δccx value of from about 0.01 to about 0.02, where the Δccx value is obtained by comparing the ccx value of the yellow phosphor with a ccx value from a reference yellow phosphor, the reference yellow phosphor being a YAG phosphor doped with about 4 wt. % Ce and containing no other dopant elements.

8. The yellow phosphor of claim 1 having a ccy value of less than 0.52.

9. The yellow phosphor of claim 8, wherein the ccy value is from about 0.513 to about 0.515.

10. The yellow phosphor of claim 8 comprising a Δccy value of from about −0.005 to about −0.015, where the Δccy value is obtained by comparing the ccy value of the yellow phosphor with a ccy value from a reference yellow phosphor, the reference yellow phosphor being a YAG phosphor doped with about 4 wt. % Ce and containing no other detectible dopant elements.

11. A method of making a yellow phosphor, the method comprising:
   forming a reaction mixture comprising:
      a first precursor comprising cerium and oxygen;
      a second precursor comprising cerium and fluorine;
      a third precursor comprising yttrium; and
      a fourth precursor comprising aluminum;
   heating the reaction mixture in a reducing environment at a temperature sufficient to form a yellow phosphor including a host lattice comprising yttrium aluminum garnet and an activator comprising cerium (Ce) incorporated in the host lattice at a concentration of at least about 5 wt. %.

12. The method of claim 11, wherein the first precursor comprises $CeO_2$ and the second precursor comprises $CeF_3$.

13. The method of claim 11, wherein a weight ratio of the first precursor to the second precursor is at least about 1:1.

14. The method of claim 13, wherein the weight ratio is at least about 1.4:1.

15. The method of claim 14, wherein the weight ratio is at least about 1.9:1.

16. The method of claim 11, wherein the third precursor comprises $Y_2O_3$ and the fourth precursor comprises $\gamma\text{-}Al_2O_3$.

17. The method of claim 11, further comprising reducing an average particle size of the fourth precursor prior to forming the reaction mixture.

18. The method of claim 11, wherein the reaction mixture is heated to a temperature ranging from about 1375° C. to about 1550° C.

19. The method of claim 11, wherein forming the yellow phosphor comprises a liquid-phase diffusion mechanism.

20. A light emitting diode (LED) component comprising:
   a blue LED comprising a dominant wavelength in a range of from about 425 nm to about 475 nm;
   a yellow phosphor in optical communication with the blue LED, the yellow phosphor comprising a host lattice comprising yttrium aluminum garnet and an activator comprising cerium incorporated in the host lattice, the yellow phosphor having a chemical formula $Y_{3-x}Ce_xAl_5O_{12}$;
   wherein a light emission spectrum of the LED component defines a color line passing through an E3 color bin on a CIE 1931 chromaticity diagram at a position below a center point thereof.

21. The LED component of claim 20, wherein the color line passes through an E4 color bin.

22. The LED component of claim 21, wherein the color line passes through 4B and 4C sub-bins.

23. The LED component of claim 20, wherein the cerium is present at a concentration of at least about 5 wt. % Ce in the host lattice.

24. A light emitting diode (LED) component comprising:
   a blue LED comprising a dominant wavelength in a range from about 425 nm to about 475 nm;
   a yellow phosphor in optical communication with the blue LED, the yellow phosphor comprising a host lattice comprising yttrium aluminum garnet and an activator comprising cerium incorporated in the host lattice and further comprising a ccx value of at least about 0.47 and a ccy value of less than 0.52; and
   a red phosphor in optical communication with the blue LED, the red phosphor comprising a peak emission wavelength in a range of from about 610 nm to about 660 nm,
   wherein a weight ratio of the yellow phosphor to the red phosphor is greater than about 9.5.

25. The LED component of claim 24, wherein the weight ratio is as high as about 9.9.

26. The LED component of claim 24, wherein a light emission spectrum of the LED component defines a color line passing through an E5 bin on a CIE 1931 chromaticity diagram.

27. The LED component of claim 26, wherein the color line further passes through an E6 bin on the CIE 1931 chromaticity diagram.

28. The LED component of claim 24, wherein the cerium is present at a concentration of at least about 5 wt. % Ce in the host lattice.

* * * * *